United States Patent
Sasscer

(10) Patent No.: US 10,753,419 B2
(45) Date of Patent: Aug. 25, 2020

(54) HYDRAULIC DAMPING SYSTEMS

(71) Applicant: Hamilton Sundstrand Corporation, Charlotte, NC (US)

(72) Inventor: Gary Sasscer, Leaf River, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 747 days.

(21) Appl. No.: 15/172,353

(22) Filed: Jun. 3, 2016

(65) Prior Publication Data

US 2017/0350463 A1  Dec. 7, 2017

(51) Int. Cl.
| | | |
|---|---|---|
| *F16F 9/14* | (2006.01) |
| *F01D 5/02* | (2006.01) |
| *F16C 11/04* | (2006.01) |
| *B64D 41/00* | (2006.01) |

(52) U.S. Cl.
CPC ............... *F16F 9/145* (2013.01); *F01D 5/02* (2013.01); *F16C 11/04* (2013.01); *B64D 41/007* (2013.01); *F05D 2220/34* (2013.01); *F05D 2230/80* (2013.01); *F05D 2260/57* (2013.01)

(58) Field of Classification Search
CPC ... B64D 41/007; F16C 11/04; F05D 2220/34; F16F 9/12; F16D 57/02
See application file for complete search history.

(56) References Cited

U.S. PATENT DOCUMENTS

| | | | | |
|---|---|---|---|---|
| 4,681,306 A * | 7/1987 | Hofmann | ............... | F16F 13/262 188/139 |
| 4,796,875 A * | 1/1989 | Mertens | ................ | F16F 13/105 251/339 |
| 7,475,872 B2 * | 1/2009 | Kries | .................... | F16F 13/105 267/140.13 |
| 8,302,902 B2 * | 11/2012 | Lynas | ..................... | B64C 25/22 244/102 R |

FOREIGN PATENT DOCUMENTS

| | | |
|---|---|---|
| JP | S5723442 A | 2/1982 |
| JP | H0538919 A | 2/1993 |
| JP | H10115338 A | 5/1998 |
| WO | 8603725 A1 | 7/1986 |

OTHER PUBLICATIONS

Notification of Irregularity, of the French Patent Office, dated Oct. 5, 2017, in corresponding French Patent Application No. 1754843.
Notification of Lack of Unity, of the French Patent Office, dated Oct. 5, 2017, in corresponding French Patent Application No. 1754843.
Preliminary Search Report Issued in corresponding FR Application No. FR1754843, dated Oct. 16, 2019 and machine translation thereof.

* cited by examiner

*Primary Examiner* — Woody A Lee, Jr.
*Assistant Examiner* — Michael L Sehn
(74) *Attorney, Agent, or Firm* — Locke Lord LLP; Daniel J. Fiorello; Scott D. Wofsy

(57) ABSTRACT

A hydraulic damping device includes a housing defining a fluid inlet and a fluid outlet, a damping plate disposed within (Continued)

the housing, the damping plate including a plurality of damping holes defined therethrough and positioned to allow fluid communication between the fluid inlet and the fluid outlet, and a blocking member disposed within the housing and configured to rotate relative to the damping plate to progressively block the damping holes.

18 Claims, 6 Drawing Sheets

HYDRAULIC DAMPING SYSTEMS

BACKGROUND

1. Field

The present disclosure relates to hydraulic assemblies, more specifically to hydraulic damping systems (e.g., for ram air turbines).

2. Description of Related Art

Ram Air Turbines (RATs) have a controlled rate of ejection into the air stream during flight to avoid damage to the RAT or aircraft upon deployment of the RAT. This controlled rate is typically provided by the hydraulic actuator of the RAT. Traditional linear actuators typically have a series of orifices defined within the actuator that restrict fluid flow from between hydraulic cavities of the actuator during deployment of the RAT. Defining the size and location of the damping holes is a time-consuming task, and, if incorrect, the part containing the holes is unsalvageable.

These small damping holes within the actuator serve to restrict fluid flow as the actuator extends, thereby limiting the rate of deployment and associated forces. The further the extension, the greater the restriction as the passages are blocked by the mechanical position of the actuator internal clearances. Position of the orifices with respect to the axial position of the actuator is how the timing of the damping function is accomplished so that deployment forces remain below critical stress levels throughout the motion of the RAT as it deploys into the airstream. Further, the orifices cannot be inspected without removal and disassembly of the actuator.

Such conventional methods and systems have generally been considered satisfactory for their intended purpose. However, there is still a need in the art for improved hydraulic damping systems. The present disclosure provides a solution for this need.

SUMMARY

A hydraulic damping device includes a housing defining a fluid inlet and a fluid outlet, a damping plate disposed within the housing, the damping plate including one or more damping holes defined therethrough and positioned to allow fluid communication between the fluid inlet and the fluid outlet, and a blocking member disposed within the housing and configured to rotate relative to the damping plate to progressively block the damping holes.

The housing can include a first portion and a second portion configured to be connected together. The damping plate can be fixed within the first portion such that the damping holes are positioned over the fluid outlet.

In certain embodiments, the damping holes can include a pattern of reducing size and/or number in a direction of rotation of the blocking member. The blocking member can include a semi-circular wedge that progressively blocks the damping holes as it rotates.

The blocking member can include a post that extends from the housing and is configured to be attached to a rotational hinge. The post is configured to be attached to a ram air turbine hinge. The fluid inlet and the fluid outlet can be configured to be in fluid communication with a ram air turbine actuator to selectively allow hydraulic actuation of the ram air turbine actuator.

In accordance with at least one aspect of this disclosure, a ram air turbine system includes a ram air turbine, a spring loaded hydraulic actuator configured to eject the ram air turbine into the airstream while in flight, and a hydraulic damping device connected externally to hydraulic actuator for damping motion of the ram air turbine during deployment of the ram air turbine.

The hydraulic damping device can include any suitable embodiment as described above.

In accordance with at least one aspect of this disclosure, a method for altering hydraulic damping of a hydraulic damping device by replacing a first damping plate of the hydraulic damping device with a second damping plate. The second damping plate can include different damping holes than the first damping plate for example.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
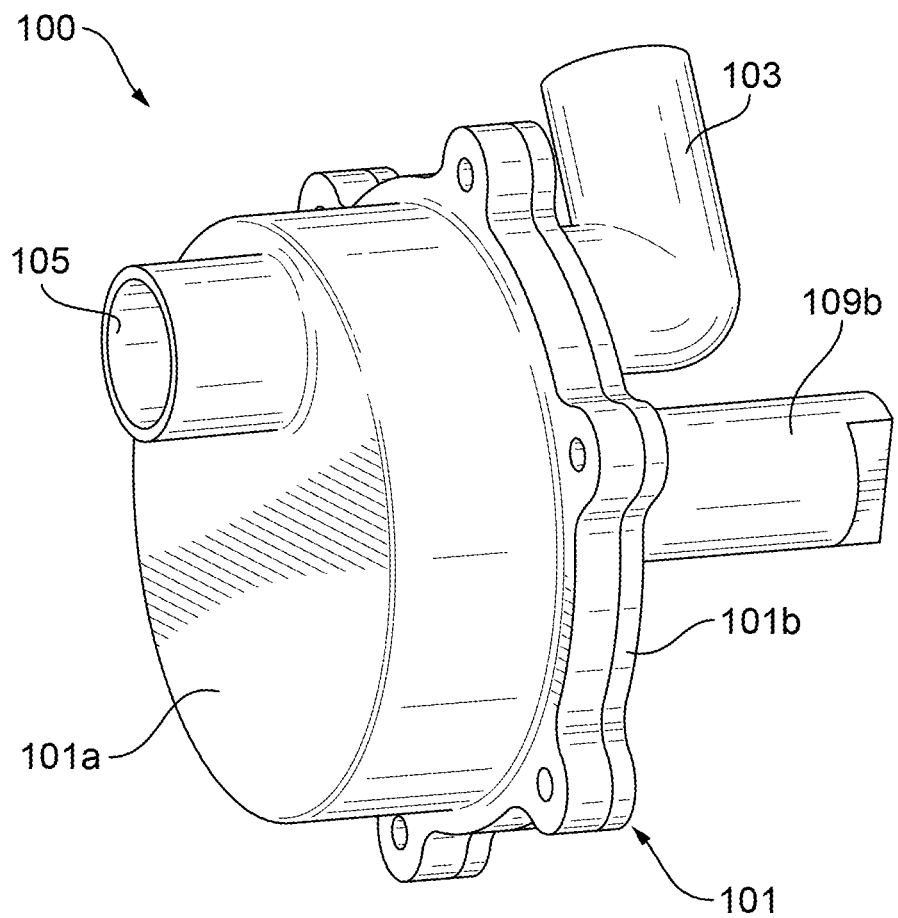
FIG. 1A is a front perspective view of an embodiment of a device in accordance with this disclosure.

Reference will now be made to the drawings wherein like reference numerals identify similar structural features or aspects of the subject disclosure. For purposes of explanation and illustration, and not limitation, an illustrative view of an embodiment of a device in accordance with the disclosure is shown in FIGS. 1A and 1s designated generally by reference character 100.

Other embodiments and/or aspects of this disclosure are shown in FIGS. 1B-2B. The systems and methods described herein can be used to regulate motion of hydraulic systems.

Figure 1B:
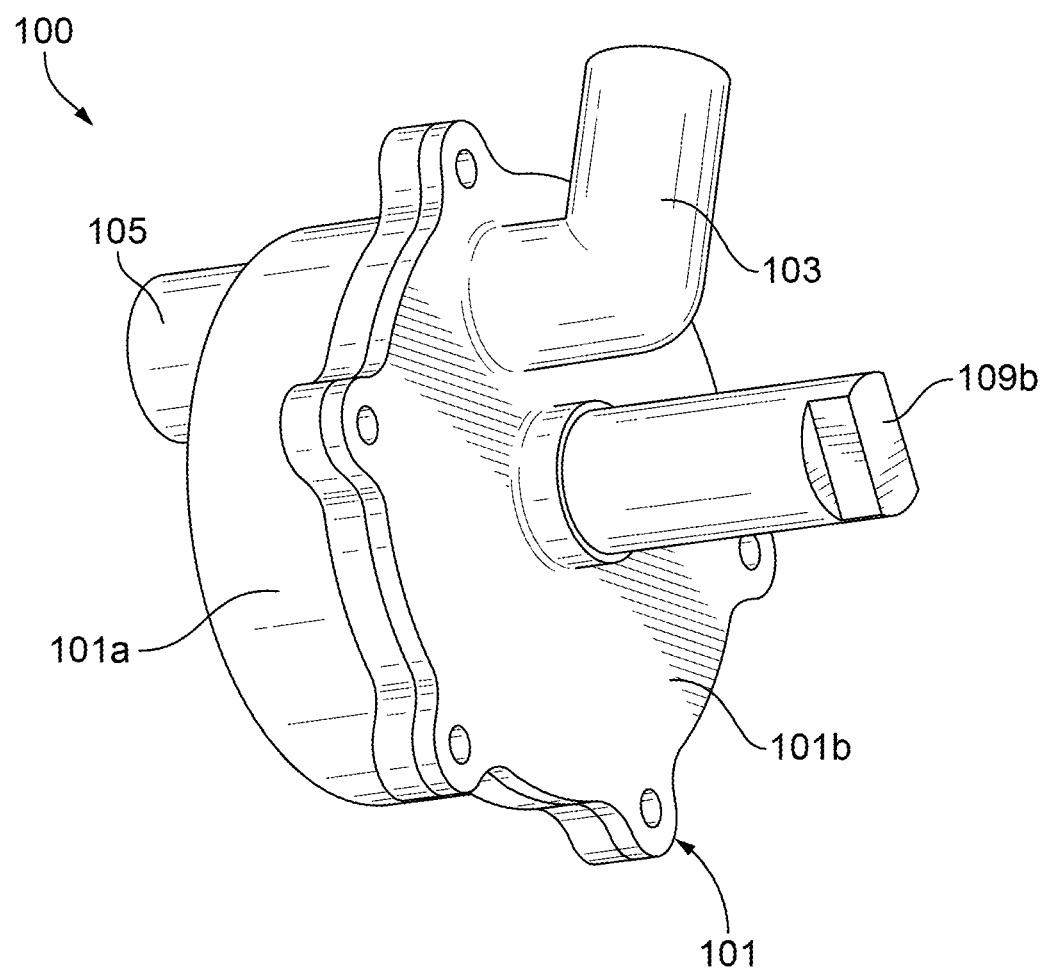
FIG. 1B is a rear perspective view of the embodiment of FIG. 1A.

Referring to FIGS. 1A and 1B, a hydraulic damping device 100 (e.g., for a ram air turbine) includes a housing 101 defining a fluid inlet 103 and a fluid outlet 103. While the fluid inlet 103 and fluid outlet 105 are described as such, one having ordinary skill in the art understands that the flow direction between the fluid inlet 103 and the fluid outlet 105 can be in either direction. As shown, the housing 101 can include a first portion 101a and a second portion 101b that are configured to be connected together (e.g., via one or more fasteners as shown).

Figure 1C:
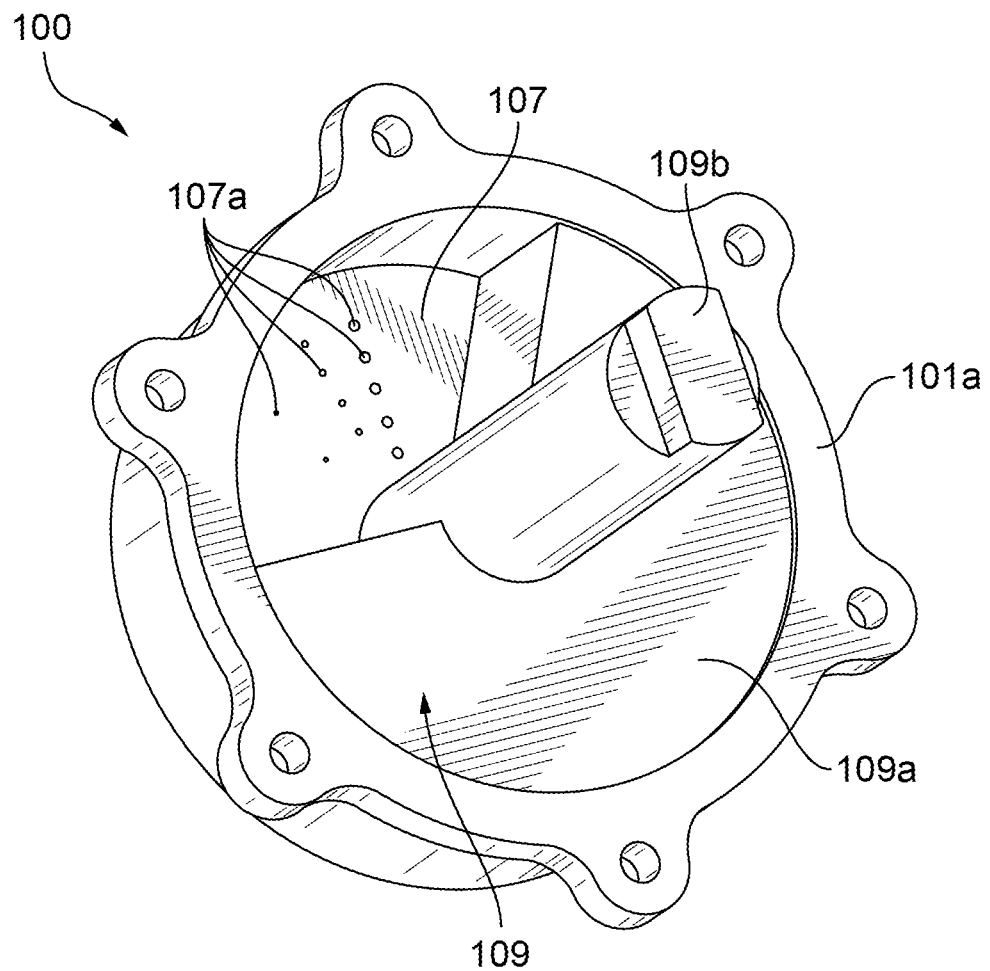
FIG. 1C is a partial rear perspective view of the embodiment of FIG. 1A, showing the second portion of the housing removed.
Figure 1D:
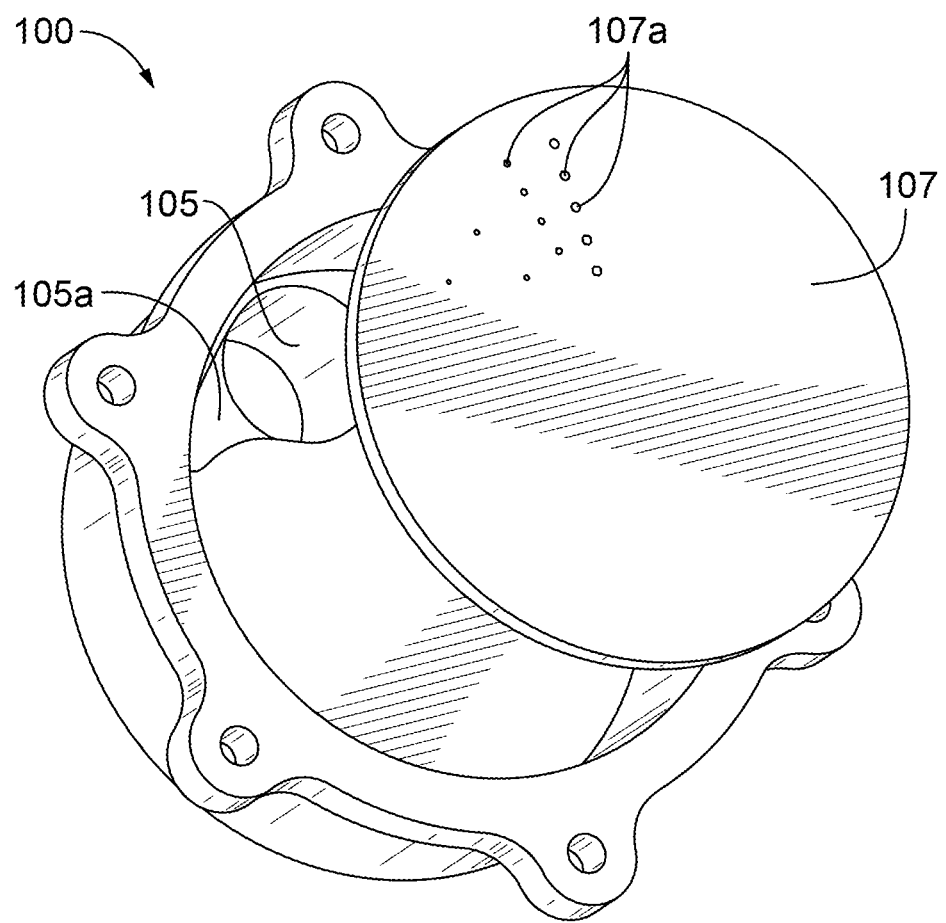
FIG. 1D is a partial rear perspective, exploded view of the embodiment of FIG. 1A, showing the damping plate removed from the first portion of the housing.

Referring to FIGS. 1C and 1D, a damping plate 107 is disposed within the housing 101 and between the fluid inlet 103 and the fluid outlet 105. The damping plate 107 includes one or more damping holes 107a defined therethrough and positioned to allow fluid communication between the fluid inlet 103 and the fluid outlet 105. Any suitable number of damping holes 107a is contemplated herein.

As shown, the damping plate 107 can be fixed within the first portion 101a of the housing 101 such that the damping holes 107a are positioned over the fluid outlet 107. Also as shown, in certain embodiments, the damping holes 107a can include a pattern of reducing size and/or number (e.g., in a direction of rotation of a blocking member 109). In certain embodiments, the fluid outlet 105 can be shaped to include a recess 105a defined in an inner surface of the first portion 101 to allow for a radially elongated flow path to the fluid outlet 105 such that the damping holes 107a can be defined unaligned with the fluid outlet 105. Any other suitable pattern and/or outlet shape is contemplated herein.

Referring to FIG. 1C, a blocking member 109 is disposed within the housing 100 and is configured to rotate relative to the damping plate 107 to progressively block the damping holes 107a. The blocking member 109 can include a semi-circular wedge 109a that progressively blocks the damping holes 107a as it rotates. Any other suitable shape is contemplated herein.

Figure 2A:
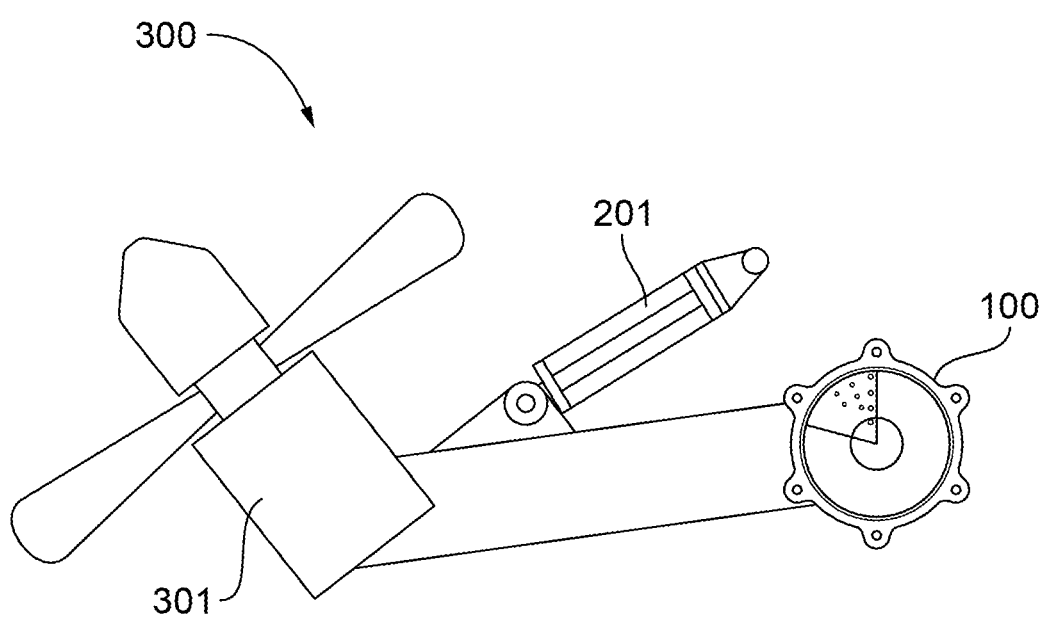
FIG. 2A is schematic view of an embodiment of a ram air turbine system in accordance with this disclosure, shown in a stowed position.
Figure 2B:
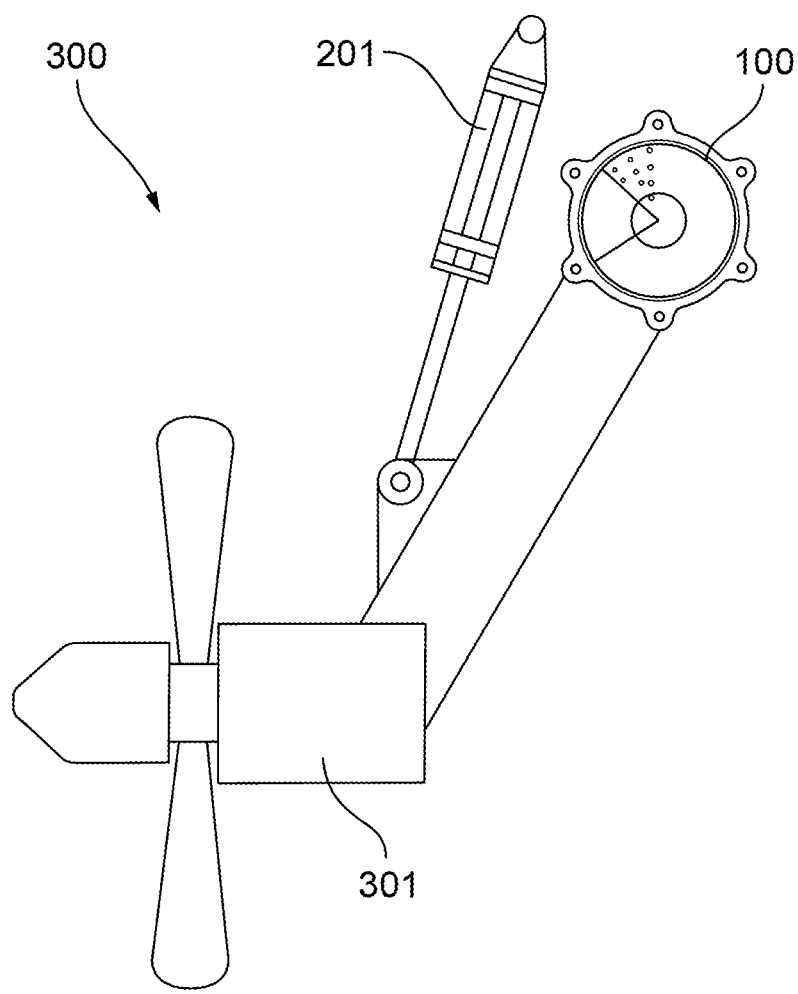
FIG. 2B is s a schematic view of the embodiment of FIG. 2A, shown in the deployed position.

The blocking member 109 can also include a post 109b that extends from the housing 101 and is configured to be attached to a rotational hinge. For example, the post 109b can be shaped to be attached to a ram air turbine hinge (e.g., as shown in FIGS. 2A and 2B). The fluid inlet 103 and the fluid outlet 105 can be configured to be in fluid communication with a ram air turbine actuator 201 to selectively allow hydraulic actuation of the ram air turbine actuator 201.

Referring additionally to FIGS. 2A and 2B, in accordance with at least one aspect of this disclosure, a ram air turbine system 300 includes a ram air turbine 301 and a hydraulic actuator 201 configured to actuate the ram air turbine 301 between a stowed position (e.g., as shown in FIG. 2A) and a deployed position (e.g., as shown in FIG. 2B). The system 100 further includes a hydraulic damping device (e.g., device 100 has described above) connected externally to hydraulic actuator 201 for damping motion of the ram air turbine 301 during deployment of the ram air turbine 301, for example.

As shown in FIG. 2A, the damping holes 107a are uncovered in the stowed position such that maximum rate of flow is allowed upon deployment of the ram air turbine 301. As the ram air turbine 301 rotates into the air stream it produces progressively more torque on the ram air turbine 301 swivel joint. However, the blocking member 109 rotates with the ram air turbine 301 which progressively covers the damping holes 107a of the damping plate 107, thereby reducing the maximum flow rate in a non-linear fashion and thus the speed of deployment up to a deployed position as shown in FIG. 2B.

The timing of the damping is via a connection to a rotary joint about which the ram air turbine 301 pivots as it deploys. As appreciated by those skilled in the art, to create a non-linear damping function, embodiments of the damping holes 107a can decrease in size and number angularly from the zero position (e.g., the stowed position).

As described above, having damping holes 107a external to the actuator 201 simplifies the actuator 201 which reduces cost of manufacture. For example, the damping holes 107a can be contained on a removable damping plate 107 inside of the damping device. Such a damping plate 107 can be easily fabricated and because it would be submerged in hydraulic fluid continuously during installation, it would require no protective plating to prevent corrosion, which is a drawback of traditional designs. Also, no seal need be used between the damping plate 107 and the blocking member 109 (only close fitting tolerance in certain embodiments), which reduces maintenance and part cost.

It is contemplated that any other switches, valves, and/or fittings from within the actuator 201 to one or more external components (e.g., the device 100) may further simplify the actuator 201 and create a subassembly that could be produced and certified without the need of a wind tunnel testing. While embodiments are described associated with ram air turbines, embodiments as described above can be used in any other suitable applications having similar deployment forces.

In accordance with at least one aspect of this disclosure, a method for altering hydraulic damping of a hydraulic damping device by replacing a first damping plate of the hydraulic damping device with a second damping plate. The second damping plate can include different damping holes than the first damping plate for example. In this regard, a user can modify damping characteristics by swapping in a new plate, for example.

The methods and systems of the present disclosure, as described above and shown in the drawings, provide for hydraulic damping systems with superior properties as described above. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A hydraulic damping device, comprising:
a housing defining a fluid inlet and a fluid outlet;
a damping plate disposed within the housing, the damping plate including a plurality of damping holes defined therethrough and positioned to allow fluid communication between the fluid inlet and the fluid outlet; and
a blocking member disposed within the housing and configured to rotate relative to the damping plate to progressively block the damping holes.

2. The device of claim 1, wherein the housing includes a first portion and a second portion configured to be connected together.

3. The device of claim 2, wherein the damping plate is fixed within the first portion such that the damping holes are positioned over the fluid outlet.

4. The device of claim 1, wherein the damping holes include a pattern of reducing size and/or number in a direction of rotation of the blocking member.

5. The device of claim 1, wherein the blocking member includes a semi-circular wedge that progressively blocks the damping holes as it rotates.

6. The device of claim 1, wherein the blocking member is engaged with a post that extends from the housing and is configured to be attached to a rotational hinge.

7. The device of claim 6, wherein the fluid inlet and the fluid outlet are configured to be in fluid communication with a ram air turbine actuator to selectively alter fluid flow rates of hydraulic fluid of the ram air turbine actuator.

8. The device of claim 7, wherein the post is configured to be attached to a ram air turbine hinge.

9. A ram air turbine system, comprising:
a ram air turbine;
a hydraulic actuator configured to actuate the ram air turbine; and
a hydraulic damping device connected externally to the hydraulic actuator for damping motion of the ram air turbine during deployment of the ram air turbine, wherein the hydraulic damping device includes:
   a housing defining a fluid inlet and a fluid outlet;
   a damping plate disposed within the housing, the damping plate including a plurality of damping holes defined therethrough and positioned to allow fluid communication between the fluid inlet and the fluid outlet; and
   a blocking member disposed within the housing and configured to rotate relative to the damping plate to progressively block the damping holes.

10. The system of claim 9, wherein the housing includes a first portion and a second portion configured to be connected together.

11. The system of claim 10, wherein the damping plate is fixed within the first portion such that the damping holes are positioned over the fluid outlet.

12. The system of claim 9, wherein the damping holes include a pattern of reducing size and/or number in a direction of rotation of the blocking member.

13. The system of claim 9, wherein the blocking member includes a semi-circular wedge that progressively blocks the damping holes as it rotates.

14. The system of claim 9, wherein the blocking member includes a post that extends from the housing and is configured to be attached to a rotational hinge.

15. The system of claim 14, wherein the fluid inlet and the fluid outlet are configured to be in fluid communication with the ram air turbine actuator to selectively allow hydraulic actuation of the ram air turbine actuator.

16. The system of claim 15, wherein the post is configured to be attached to the ram air turbine hinge.

17. A method for altering hydraulic damping of a hydraulic damping device by replacing a first damping plate of the hydraulic damping device with a second damping plate such that the hydraulic damping device includes:
   a housing defining a fluid inlet and a fluid outlet;
   the second damping plate disposed within the housing, the damping plate including a plurality of damping holes defined therethrough and positioned to allow fluid communication between the fluid inlet and the fluid outlet; and
   a blocking member disposed within the housing and configured to rotate relative to the damping plate to progressively block the damping holes.

18. The method of claim 17, wherein the second damping plate includes different damping holes than the first damping plate.

* * * * *